US011159346B2

(12) United States Patent
Visotsky et al.

(10) Patent No.: US 11,159,346 B2
(45) Date of Patent: Oct. 26, 2021

(54) CO-POLARIZED FEEDBACK FOR FREQUENCY DOMAIN COMPRESSION

(71) Applicant: Nokia Technologies Oy, Espoo (FI)

(72) Inventors: Eugene Visotsky, Buffalo Grove, IL (US); Rana Ahmed Salem, Munich (DE); Frederick Vook, Schaumburg, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/927,972

(22) Filed: Jul. 13, 2020

(65) Prior Publication Data

US 2021/0036893 A1 Feb. 4, 2021

Related U.S. Application Data

(60) Provisional application No. 62/882,269, filed on Aug. 2, 2019.

(51) Int. Cl.
*H04L 25/02* (2006.01)
*H04B 7/06* (2006.01)
*H04B 7/0456* (2017.01)
*H04B 7/10* (2017.01)

(52) U.S. Cl.
CPC ....... *H04L 25/0202* (2013.01); *H04B 7/0469* (2013.01); *H04B 7/0626* (2013.01); *H04B 7/10* (2013.01)

(58) Field of Classification Search
CPC . H04L 25/0202; H04B 7/0469; H04B 7/0626; H04B 7/10
See application file for complete search history.

(56) References Cited

U.S. PATENT DOCUMENTS

| 2017/0279514 | A1 | 9/2017 | Rahman et al. |
| 2018/0131420 | A1* | 5/2018 | Faxer ................ H04B 7/0469 |
| 2019/0140712 | A1 | 5/2019 | Faxer et al. |
| 2019/0238268 | A1* | 8/2019 | Kim .................. H04L 1/0058 |
| 2020/0343961 | A1* | 10/2020 | Miao ................. H04B 7/0617 |

FOREIGN PATENT DOCUMENTS

| EP | 3681197 A1 | 7/2020 |
| KR | 1020170103917 A | 9/2017 |
| KR | 1020190010864 A | 1/2019 |
| WO | 2016/114708 A2 | 7/2016 |
| WO | 2019/071383 A1 | 4/2019 |

OTHER PUBLICATIONS

"WI Proposal on NR MIMO Enhancements", 3GPP TSG RAN Meeting #80, RP-181453, Agenda : 9.1.1, Samsung, Jun. 11-14, 2018, 5 pages.

(Continued)

*Primary Examiner* — Jaison Joseph
(74) *Attorney, Agent, or Firm* — Nokia Technologies Oy

(57) ABSTRACT

A method for implementing co-polarized feedback for frequency domain compression is disclosed. The method includes feeding back compressed channel state information, wherein at least one layer is restricted to be transmitted on one polarization and the feedback for the at least one layer only involves the channel state information on the one polarization.

21 Claims, 11 Drawing Sheets

(56) References Cited

OTHER PUBLICATIONS

Vook et al., "System level performance characteristics of sub-6GHz massive MIMO deployments with the 3GPP New Radio", IEEE 88th Vehicular Technology Conference (VTC—Fall), 2018, 5 pages.

"WF on Type I and II CSI codebooks", 3GPP TSG-RAN WG1 #89, R1-1709232, Agenda : 7.1.2.3, Samsung, May 15-19, 2017, 24 pages.

"CSI Overhead Reduction for Type II codebook up to rank 2", 3GPP TSG RAN WG1 Meeting #96, R1-1902562, Agenda : 7.2.8.1, Nokia, Feb. 24-Mar. 1, 2019, 17 pages.

"CSI enhancement for MU-MIMO", 3GPP TSG RAN WG1 meeting #96bis, R1-1904447, Agenda : 7.2.8.1, Samsung, Apr. 8-12, 2019, pp. 1-8.

"SLS evaluation on MU-MIMO CSI: Rank 3-4 parameter setting and subset selection", 3GPP TSG RAN WG1 meeting #96bis, R1-1904455, Agenda : 7.2.8.6, Samsung, Apr. 8-12, 2019, 5 pages.

"Summary of CSI enhancement for MU-MIMO", 3GPP TSG RAN WG1 96, R1-1902304, Agenda : 7.2.8.1, Samsung, Feb. 25-Mar. 1, 2019, 16 pages.

Ahmed et al., "Overhead Reduction of NR Type II CSI for NR Release 16", 23rd International ITG Workshop on Smart Antennas, 2019, pp. 1-5.

"Type II CSI feedback compression", 3GPP TSG RAN WG1 Ad-Hoc Meeting 1901, R1-1900501, Agenda : 7.2.8.1, Intel Corporation, Jan. 21-25, 2019, pp. 1-15.

"Discussion on overhead reduction for Type II codebook", 3GPP TSG RAN WG1 #97, R1-1906729, Agenda : 7.2.8.1, LG Electronics, May 13-17, 2019, 11 pages.

Ahmed et al., "Explicit CSI Feedback Design for 5G New Radio Phase II", 22nd International ITG Workshop on Smart Antennas, 2018, pp. 1-5.

"3rd Generation Partnership Project; Technical Specification Group Radio Access Network; Study on 3D channel model for LTE (Release 12)", 3GPP TR 36.873, V12.6.0, Sep. 2017, pp. 1-47.

Office action received for corresponding Korean Patent Application No. 2020-0096035, dated May 10, 2021, 4 pages of office action and 1 page of Translation available.

\* cited by examiner

CO-POLARIZED FEEDBACK FOR FREQUENCY DOMAIN COMPRESSION

TECHNICAL FIELD

The examples and non-limiting embodiments relate generally to communications and, more particularly, to co-polarized feedback for frequency domain compression.

BACKGROUND

It is known to estimate channel properties of a communication link for the purpose of, for example, tracking a fading channel.

SUMMARY

The following summary is merely intended to be an example. The summary is not intended to limit the scope of the claims.

In accordance with one aspect, a method includes feeding back compressed channel state information, wherein at least one layer is restricted to be transmitted on one polarization and the feedback for the at least one layer only involves the channel state information on the one polarization.

In accordance with another aspect, a method includes receiving fed back compressed channel state information, wherein at least one layer is restricted to be transmitted on one polarization and the feedback for the at least one layer only involves the channel state information on the one polarization.

In accordance with another aspect, an apparatus includes at least one processor; and at least one memory including computer program code; wherein the at least one memory and the computer program code are configured to, with the at least one processor, cause the apparatus at least to perform: feeding back compressed channel state information, wherein at least one layer is restricted to be transmitted on one polarization and the feedback for the at least one layer only involves the channel state information on the one polarization.

In accordance with another aspect, an apparatus includes at least one processor; and at least one memory including computer program code; wherein the at least one memory and the computer program code are configured to, with the at least one processor, cause the apparatus at least to perform: receiving fed back compressed channel state information, wherein at least one layer is restricted to be transmitted on one polarization and the feedback for the at least one layer only involves the channel state information on the one polarization.

In accordance with another aspect, a non-transitory program storage device readable by a machine, tangibly embodying a program of instructions executable by the machine for performing operations is disclosed, the operations comprising: feeding back compressed channel state information, wherein at least one layer is restricted to be transmitted on one polarization and the feedback for the at least one layer only involves the channel state information on the one polarization.

In accordance with another aspect, a non-transitory program storage device readable by a machine, tangibly embodying a program of instructions executable by the machine for performing operations is disclosed, the operations comprising: receiving fed back compressed channel state information, wherein at least one layer is restricted to be transmitted on one polarization and the feedback for the at least one layer only involves the channel state information on the one polarization.

BRIEF DESCRIPTION OF THE DRAWINGS

The foregoing aspects and other features are explained in the following description, taken in connection with the accompanying drawings, wherein.

DETAILED DESCRIPTION OF EXAMPLE EMBODIMENTS

Figure 1:
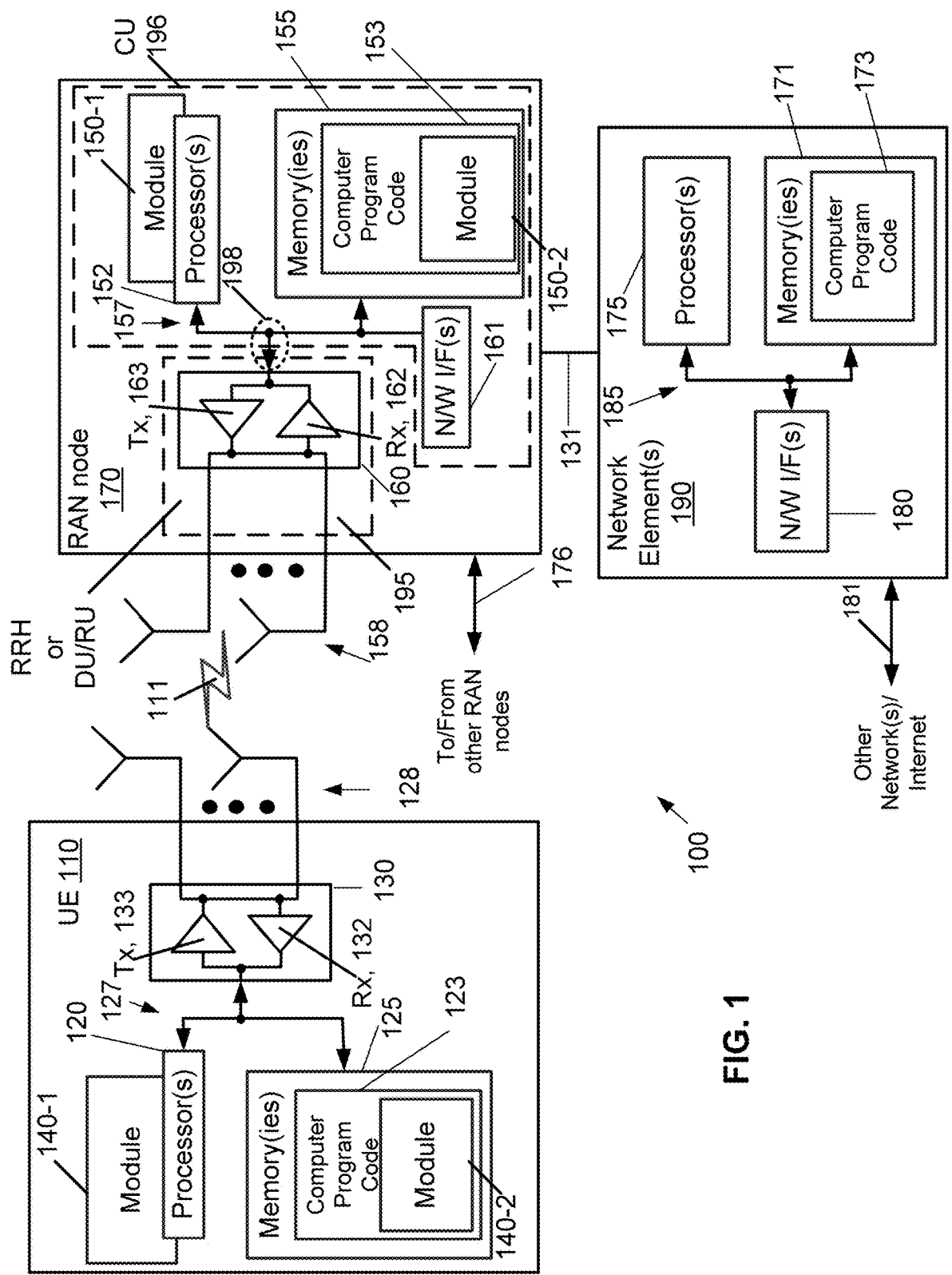
FIG. 1 is a block diagram of one possible and non-limiting system in which the example embodiments may be practiced.

The following acronyms and abbreviations that may be found in the specification and/or the drawing figures are defined as follows:

2D two dimensional
3GPP third generation partnership project
5G fifth generation
5GC 5G core network
AMF access and mobility management function
BWP bandwidth part
CDF cumulative distribution function
co-pol co-polarized
cross-pol cross polarization
CSI channel state information
CSI-RS channel state information reference signal
CU central unit
DFT discrete Fourier transform
DL downlink
DU distributed unit
DSP digital signal processor
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC E-UTRA evolved universal terrestrial radio access, i.e., the LTE radio access technology
FD frequency domain
FDD frequency division duplex
FR frequency range
gNB (or gNodeB) base station for 5G/NR, i.e., a node providing NR user plane and control plane protocol terminations towards the UE, and connected via the NG interface to the 5GC
GoB grid-of-beam
I/F interface
LC linear combination
LCC linear combination coefficients
LTE long term evolution
MIMO multiple-input/multiple-output
MME mobility management entity
mMIMO massive MIMO
MR maximum rank
MU multiple user
ng or NG new generation
ng-eNB or NG-eNB new generation eNB
NR new radio
N/W or NW network
PDA personal digital assistant
PDCP packet data convergence protocol
PHY physical layer
PMI precoding matrix indicator
PRB physical resource blocks
RAN radio access network
RB resource block
Rel. release
RLC radio link control
RRH remote radio head
RRC radio resource control
RS reference signal
RU radio unit
Rx receiver
SB subband
SDAP service data adaptation protocol
SGW serving gateway
SMF session management function
Tx transmitter
UE user equipment (e.g., a wireless, typically mobile device)
UL uplink
UPF user plane function
UPT user perceived throughput
WB wideband
WI work item
WID work item description Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

In Rel. 15, NR type II CSI is an eigenvector approximation scheme for CSI feedback, defined up to rank=2 transmission. This limitation is mostly due the large feedback overhead that may result from a higher rank CSI feedback. Indeed, the feedback overhead of NR type II scales linearly with the rank of the CSI feedback, if the legacy framework were simply extended. This may require a significant increase of the necessary uplink resources to perform the feedback. Despite this limitation, legacy Type II codebook can achieve up to 36% performance enhancement over LTE at the cost of higher feedback overhead as compared to the latter [See, e.g., F. W. Vook et al., "System level performance characteristics of sub-6 GHz massive MIMO deployments with the 3GPP New Radio," in IEEE VTC Fall 2018, 2018.].

An overview on NR type II CSI in Rel. 15 is as follows [see, e.g., R1-1709232 "WF on Type I and II CSI codebooks" RAN1 #89 May 2017]. The precoding vector in Rel. 15 NR type II CSI is written as $$W = W_1 W_2 \quad (1)$$

The final weighting vector at the gNB is a weighted linear combination of L orthogonal beams per polarization as $$\tilde{w}_{r,l} = \sum_{i=0}^{L-1} b_{k_1^{(i)} k_2^{(i)}} \cdot p_{r,l,i}^{(WB)} p_{r,l,i}^{(SB)} \cdot c_{r,l,i}$$

The term $b_{k_1^{(i)} k_2^{(i)}}$ is the long-term two-dimensional (2D) discrete Fourier transform (DFT) beam, the term $p_{r,l,i}^{(WB)}$ is the beam power scaling factor for wideband, the term $p_{r,l,i}^{(SB)}$ is the beam power scaling factor for subband, and the term $c_{r,l,i}$ is the beam combining coefficient.

In order to build $\tilde{w}_{r,l}$, the following steps are performed:
1. Building the grid-of-beam matrix $W_1$ of size $2N_1 N_2 \times 2L$: choose L orthogonal vectors/beams per polarization r from a set of oversampled $O_1 O_2 N_1 N_2$ DFT beams, where $N_1$ and $N_2$ are the number of antenna ports in horizontal and vertical domains. $O_1$ and $O_2$ are the oversampling factors in both dimensions. This collection of vectors may be used to approximate the eigenvectors of the channel covariance matrix by means of suitable weighted linear combinations. This operation achieves a compression in the spatial domain (SD), hence the resulting 2L beams are also referred to as SD components.
2. Building the linear combination subband matrix $W_2$: for every subband, calculate the coefficients to be used for the weighted linear combination of the columns of $W_1$ yielding the aforementioned approximation of the l strongest eigenvectors of the channel covariance matrix.
3. Quantization of linear combining coefficients: the correlation between the coefficients of the different $W_2$ across all the subbands is exploited to achieve a reduction of the overall number of coefficients to feed back by means of a differential wideband+subband quantization.

Enhancement of type II CSI feedback for Rel. 16 was agreed in 3GPP based on exploiting the frequency correlation. A frequency domain (FD) compression scheme is applied on subband matrix $W_2$. The precoder for each layer and across frequency-domain units W is derived as follows:

$$W = W_1 \tilde{W}_2 W_f^H \quad (2)$$

Rel. 16 NR type II CSI could provide a significant gain over Rel. 15 type II CSI, as shown in [R1-1902562 CSI Overhead Reduction for Type II codebook up to rank 2, Nokia, RAN1#96 Athens].

In NR type II CSI in Rel. 15 and 16, approximated eigenvectors are possibly compressed (for Rel. 16), quantized and fed back to the gNB. Naturally, channel eigenvectors cannot be predicted on the Euclidean space as in explicit CSI case. Two (non-zero) vectors $s_1, s_2 \in \mathbb{C}^M$ are called equivalent $s_1 \sim s_2$ in terms of subspaces if and only if there exists a (non-zero) scalar $a \in \mathbb{C}$ such that $s_1 = a s_2$. A different criterion to judge the deviation between two normalized eigenvectors $s_1$ and $s_2$ is to compute the chordal distance, which is sine (abbreviated as sin) of the angle between the two eigenvectors on the Grassmannian manifold $G_{M,1}$, represented and computed as:

$$d_c(s_1, s_2) = \sin(\theta_{1,2}) = \sqrt{1 - \|s_1^H s_2\|} \quad (3)$$

Figure 2:
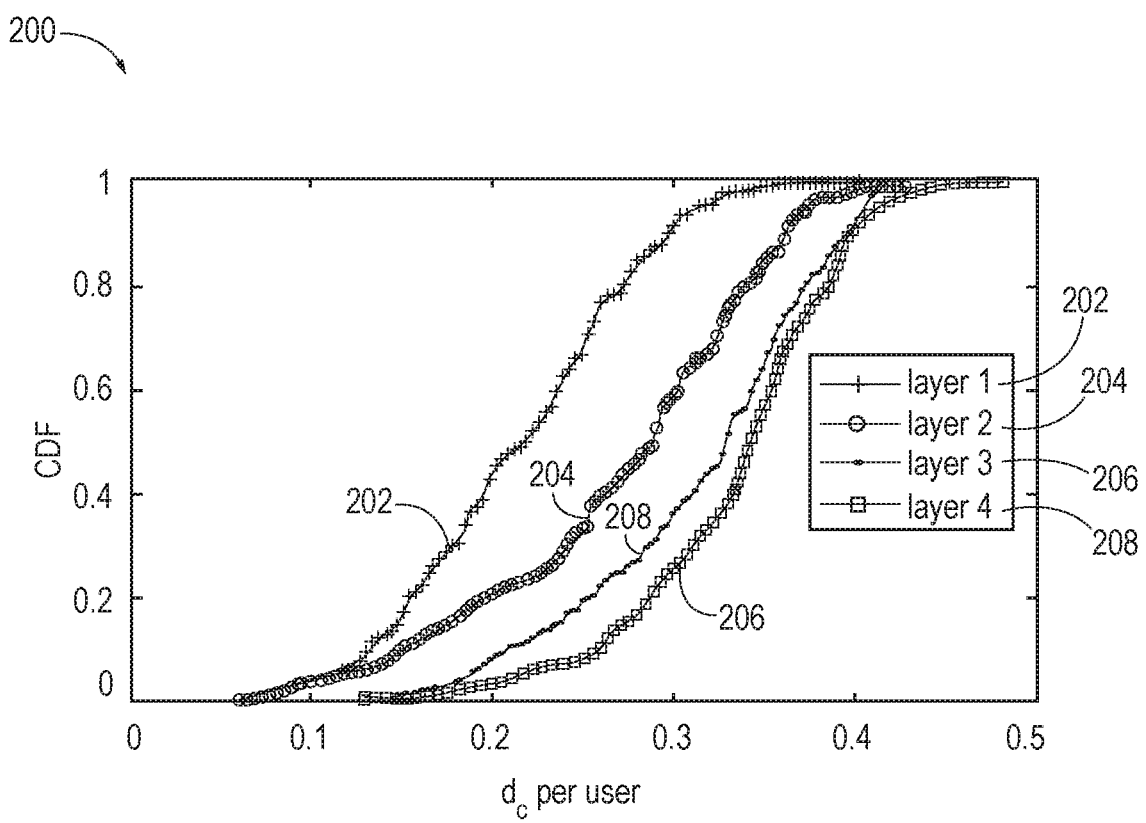
FIG. 2 depicts the cumulative distribution function (CDF) of chordal distance for layer 1 to 4 between eigenvectors before and after Rel. 15 New Radio (NR) type II channel state information (CSI) quantization.

As the layer index increases, the weaker eigenvectors exhibit lower correlation in frequency domain. This may be observed in FIG. 2 which shows a graph 200 of the CDF of the chordal distance ($d_c$) for 4 layers (including layer 1—202, layer 2—204, layer 3—206, and layer 4—208) after Rel. 15 NR type II CSI (which exploits the frequency correlation in the quantization step via subband/wideband amplitude quantization).

Rel. 16 FD compression relies even more heavily on frequency correlation of the eigenvectors across the subbands. That is why it is even more negatively impacted by this effect of loss of frequency correlation with increasing layer index as is clear in FIG. 3, with M=7 and $K_0$=42.

Figure 3:
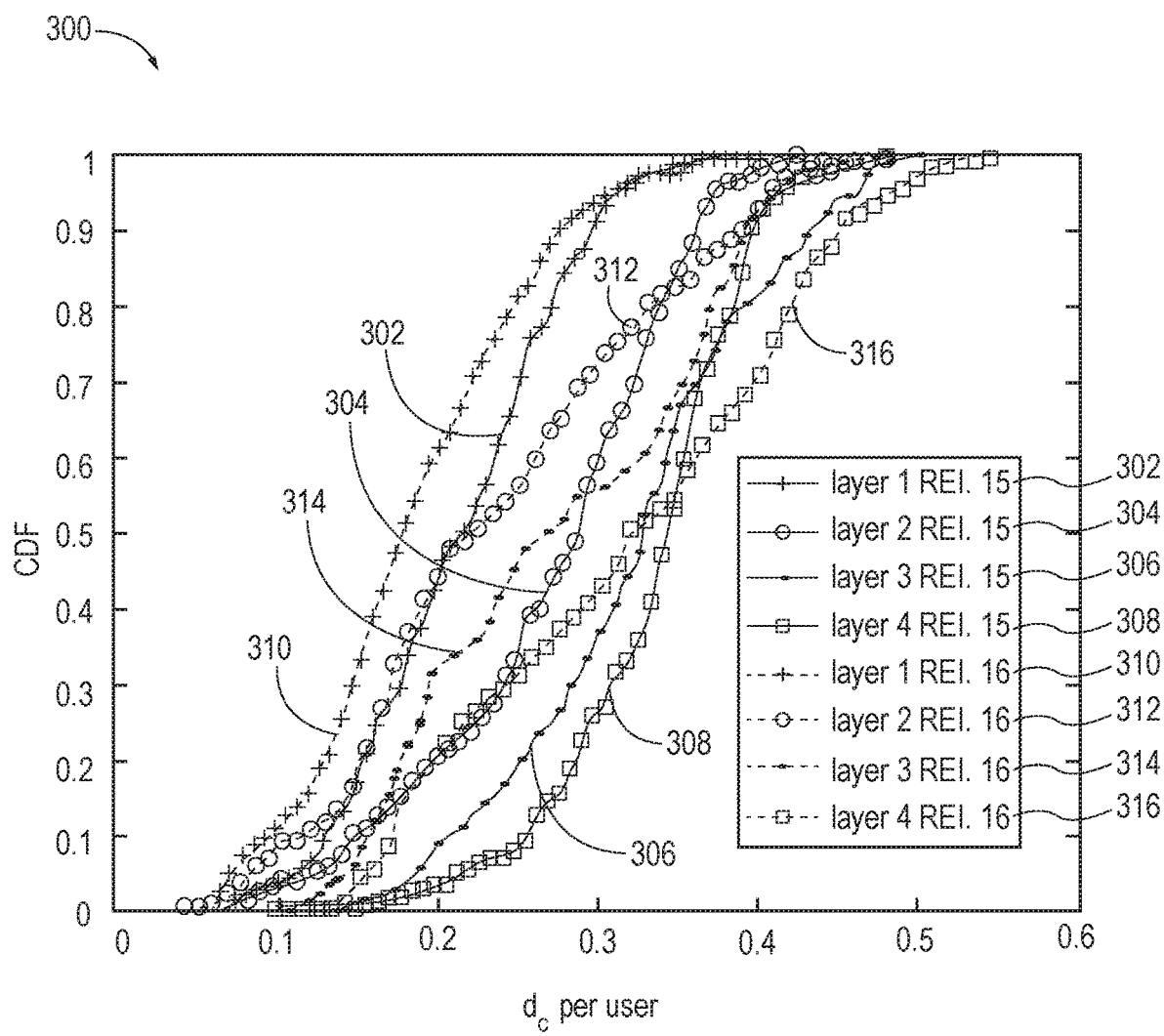
FIG. 3 depicts the CDF of chordal distance for layer 1 to 4 between eigenvectors before and after Rel. 15 NR type II CSI quantization and Rel. 16 NR type II CSI frequency domain (FD) compression and quantization.

FIG. 3 depicts the CDF of chordal distance for layer 1 to 4 between eigenvectors before and after Rel. 15 NR type II CSI quantization and Rel. 16 NR type II CSI frequency domain (FD) compression and quantization. Item 302 corresponds to layer 1 Rel. 15, item 304 corresponds to layer 2 Rel. 15, item 306 corresponds to layer 3 Rel. 15, item 308 corresponds to layer 4 Rel. 15, item 310 corresponds to layer 1 Rel. 16, item 312 corresponds to layer 2 Rel. 16, item 314 corresponds to layer 3 Rel. 16, and item 316 corresponds to layer 4 Rel. 16.

As shown in FIG. 3, the first layer 1 with Rel. 16 (item 310) compression gives a better estimate of the strongest eigenvector (smaller chordal distance) compared to Rel. 15 compression. However, as the layer index increases, this advantage is gradually decreasing.

Figure 4:
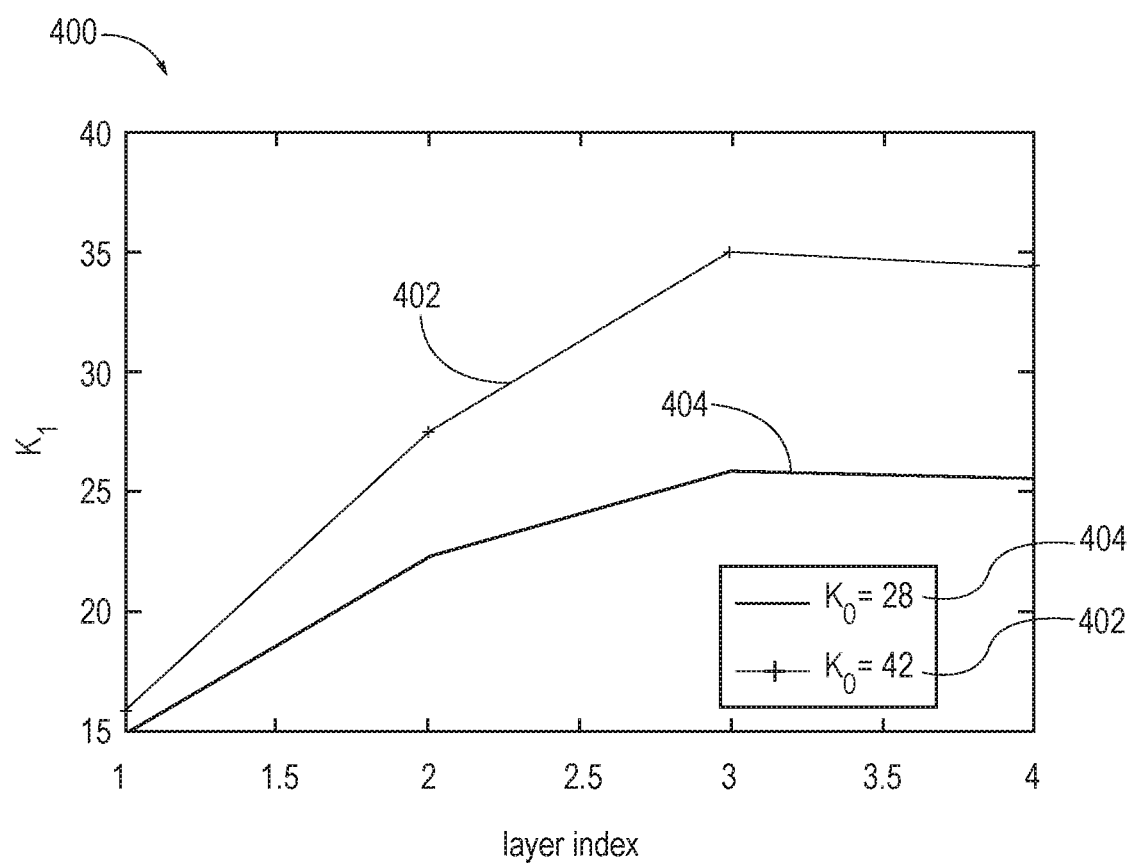
FIG. 4 depicts quantization $K_1$ after FD frequency compression for layers 1 to 4.

This weaker correlation has a direct impact on the final UL overhead, where as shown in FIG. 4, although the higher layers are actually weaker in power and should not be assigned a higher overhead, they also cannot be compressed very much and therefore the number of non-zero FD coefficients after compression and quantization $K_1$ gets higher as the layer index increases. Accordingly, FIG. 4 depicts a graph 400 showing quantization $K_1$ after FD frequency compression for layers 1 to 4. Plot 402 corresponds to $K_0$=42, and plot 404 corresponds to $K_0$=28.

During the Rel. 16 standardization discussions, it was proposed that this issue can be mitigated by choosing a different grid-of-beam matrix $W_1$ per layer or per group of layers. [R1-1904447, R1-1904455].

The examples disclosed herein describe an enhancement to Rel. 16 FD compression where the different layers are transmitted on different beam polarizations, e.g. all odd layers are transmitted on polarization 0 and all even layers are transmitted on polarization 1. Considering for example a case with MR=2 (i.e., the Max Rank (MR) scheduled per UE is 2), this means that every polarization may be actually be carrying the strongest eigenvector of that polarization and hence the effect of frequency correlation loss may be better controlled. And with better compression, this means the number of non-zero FD coefficients after quantization $K_1$ is going to be smaller and hence a smaller quantization overhead. Certain examples disclosed herein are described where rank indicator (RI) RI=2. However, generally, the described methods are applicable for any layer in Rel. 16 transmission such that the transmission of that layer is done on one polarization only and not on the two polarizations.

This gain in FD compression of course comes at the expense of reduced array gain, however it also gives an advantage of lower complexity requirements, because the size of the linear combination (LC) matrix is reduced by half, which simplifies the procedure for obtaining the subband eigenvectors. In other words, even if the example schemes disclosed herein offer close performance to the baseline case, with all layers transmitted on both polarizations, the herein described methods have the advantage that they require lower complexity since eigen decomposition is to be performed on per-subband channel matrices which are half the size per dimension, as compared to legacy FD compression methods.

Intuitively, the motivation behind the examples disclosed herein is as follows. With cross-pol arrays (whether in Frequency Range 1 (FR1) or Frequency Range 2 (FR2)), the co-pol elements tend to be highly correlated, whereas the correlation across polarizations tends to be low. As a result, if we form a first beam with the elements of one polarization and form a second beam with the elements of the other polarization, then each beam may tend to be more "stable" over time and frequency due to the high correlation of the channel responses on the elements being beamformed (where "stable" is a loose term referring to how the beam stays effective across time or frequency in spite of the multipath fading). However, the combined (scalar) channel formed by one beam on one polarization tends to be uncorrelated with the combined (scalar) channel formed by the other beam on the other polarization. Therefore, this tends to cause an expectation that layers formed over only co-pol elements may be more "stable" over both time and frequency compared with layers formed over elements of both polarizations. As a result, it is expected that the coefficients that form the layers may be less variable over frequency and therefore may benefit more from frequency-domain compression than layers formed over sets of cross-pol elements.

The examples disclosed herein do not necessarily involve reducing the size of the basis. Rather, the examples disclosed herein restrict the overall precoder for one layer to be transmitted from only one polarization, while the overall precoder for the other layer is transmitted from only the other polarization (all of this discussion is for Rank 2). The examples described herein eliminate the need for the overall precoder for a given layer to have to track the decorrelated channel variations across two polarizations. The net result is a precoder that is more "stable" over time and frequency, since the precoding for a layer is being done only on highly correlated elements (co-pol elements) rather than a mix of correlated and decorrelated elements (as done in Type I/II).

To explain in detail, the $2N_1N_2 \times 2L$ grid-of-beam (GoB) matrix may be written as $$W_1 = \begin{bmatrix} B & \\ & B \end{bmatrix} \quad (4)$$

where $N_1$ and $N_2$ are the number of antenna ports in azimuth and elevation direction, and L is the number of beams per polarization. For one layer l and one subband k is the L×1 LC coefficients of the long-term spatial beams is denoted by: $W_{2L \times 1}^{l,k}$.

For RI=2, the final 2L×RI $W_{2L \times RI}$ LC matrix for one subband, where RI is the rank indicator, i.e., how many layers are assigned to that UE, may be written as (for example for RI=2)

$$W_{2L \times RI}^{k} = \begin{bmatrix} W_{2L \times 1}^{1,k} & 0 \\ 0 & W_{2L \times 1}^{2,k} \end{bmatrix} \quad (5)$$

where $W_{2L \times 1}^{1,k}$ is drawn from the first eigenvector of the first polarization while $W_{2L \times 1}^{2,k}$ is drawn from the strongest eigenvector of the 2nd polarization. In general, $W_{2L \times 1}^{1,k}$ is drawn from the eigenvector number $x = \lceil 0.5 \times l \rceil$ from polarization number 1 if l is odd and polarization number 2 if l is even. In order to obtain $W_{2L \times 1}^{l,k}$ smaller complexity is now required at the UE as indicated earlier. Note that in the CSI feedback step, only the non-zero elements are going to be sent, i.e. what is actually sent is $$W_{2L \times RI}^{k'} = [W_{2L \times 1}^{1,k} W_{2L \times 1}^{2,k}] \quad (6)$$

At the gNB side, the gNB combines information from equations (4) and (6) as:

1—Build $W_{22L \times RI}^{k}$ from $W_{2L \times RI}^{k'}$

2—Build the precoding vector as usual $W^* = W_1 W_{22L \times RI}^{k}$ (7)

To indicate how different this approach is from the state-of-the-art, consider how the LC matrix is formed according to the current standard in equation (5)

$$W_{22L \times RI}^{k} = [W_{22L \times 1}^{1,k} W_{22L \times 1}^{2,k}] \quad (8)$$

where $W_{2L \times 1}^{i,k}$ is now the $i^{th}$ eigenvector used to co-phase the beams on both polarizations, and hence is of size 2L×1.

For one layer l, the LC matrix $$W_{22L \times N_3}$$

now of size $2L \times N_3$, where $N_3$ is the number of subbands, may be written as, assuming l is odd:

$$W_{22L \times N_3} = \begin{bmatrix} W_{2L \times 1}^{l,1} & W_{2L \times 1}^{l,2} & \cdots & W_{2L \times 1}^{l,N_3-1} & W_{2L \times 1}^{l,N_3} \\ 0 & 0 & 0 & 0 \end{bmatrix} \quad (9)$$

and if l is even:

$$W_{22L \times N_3} = \begin{bmatrix} 0 & 0 & \cdots & 0 & 0 \\ W_{2L \times 1}^{l,1} & W_{2L \times 1}^{l,2} & & W_{2L \times 1}^{l,N_3-1} & W_{2L \times 1}^{l,N_3} \end{bmatrix} \quad (10)$$

For Rel. 16 the same concept applies just using corresponding linear combining coefficients LCC $\tilde{W}_{22L \times M}$ instead of $$W_{22L \times N_3}.$$

For example, for layer l, LCC $\tilde{W}_{22L \times M}$ of size 2L×M, where M is the number of FD coefficients assuming l is odd:

$$\tilde{W}_{22L \times M}^{l} = \begin{bmatrix} \tilde{W}_{2L \times 1}^{l,1} & \tilde{W}_{2L \times 1}^{l,2} & \cdots & \tilde{W}_{2L \times 1}^{l,M-1} & \tilde{W}_{2L \times 1}^{l,M} \\ 0 & 0 & 0 & 0 \end{bmatrix} \quad (11)$$

If l is even:

$$\tilde{W}_{22L \times M}^{l} = \begin{bmatrix} 0 & 0 & \cdots & 0 & 0 \\ \tilde{W}_{2L \times 1}^{l,1} & \tilde{W}_{2L \times 1}^{l,2} & & \tilde{W}_{2L \times 1}^{l,M-1} & \tilde{W}_{2L \times 1}^{l,M} \end{bmatrix} \quad (12)$$

In order to obtain $\tilde{W}_{2_{L\times 1}}^{l,m}$ smaller complexity is now required at the UE as indicated earlier Similar to equation (4), what now needs to be fed back to the gNB is only the non-zero parts of $$\hat{W}_{2_{2L\times RI}}^{m} = \begin{bmatrix} \hat{W}_{2_{L\times 1}}^{1,m} & 0 \\ 0 & \hat{W}_{2_{L\times 1}}^{2,m} \end{bmatrix} \quad (13)$$

and the block diagonals of the bit-map matrix $$T_{2L\times RI}^{m} = \begin{bmatrix} T_{L\times 1}^{1,m} & 0 \\ 0 & T_{L\times 1}^{2,m} \end{bmatrix} \quad (13b)$$

Note that in Rel. 16 it was decided in RAN1#AH-1901 Taipei that a bitmap is used to indicate non-zero coefficient indices inside the matrix of linear combining coefficients $\tilde{W}_{2_{2L\times M}}$.
i.e. the UE only needs to feed back $$\tilde{W}_{2_{L\times RI}}^{m'} = [\tilde{W}_{2_{L\times 1}}^{1,m} \tilde{W}_{2_{L\times 1}}^{2,m}] \quad (14)$$

and $$T_{L\times RI}^{m'} = [T_{L\times 1}^{1,m} T_{L\times 1}^{2,m}] \quad (14b)$$

At the gNB side, the gNB combines information from equations (4) and (14) as:
1. Build $\tilde{W}_{2_{L\times 1}}^{l,m}$ from $\tilde{W}_{2_{L\times RI}}^{m'}$ for all FD components
2. Build $\tilde{W}_{2_{2L\times M}}^{l}$ for each layer
3. Build the precoding vector as usual for each layer:

$$W^l = W_1 \tilde{W}_{2_{2L\times M}}^{l} W_f^H \quad (15)$$

Figure 5:
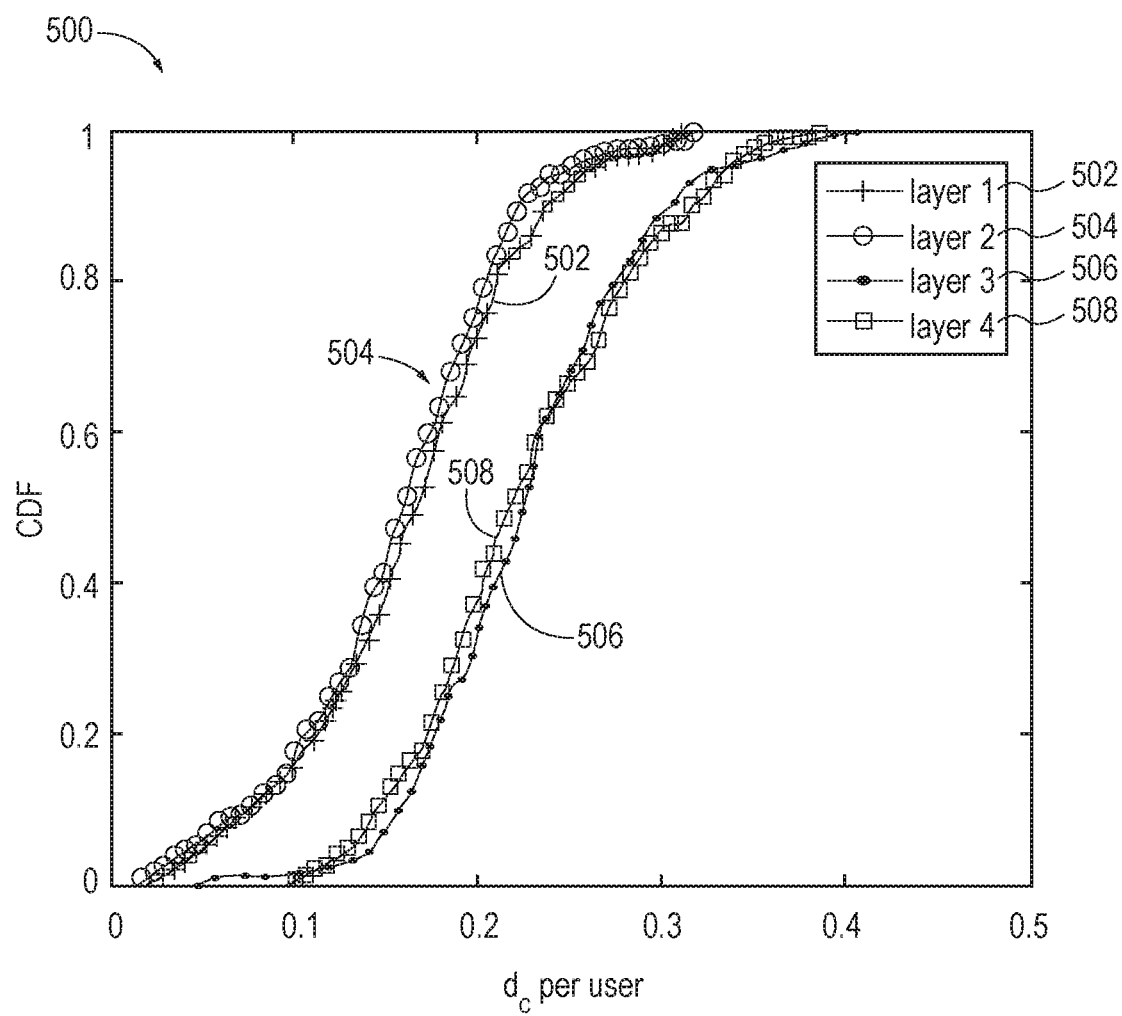
FIG. 5 depicts the CDF of chordal distance per user with copolar transmission in Rel. 16.

FIG. 5 shows a graph 500 of the CDF of the chordal distance per user when co-polar transmission is applied to Rel. 16 FD compression according to equations (4), (5), and (6). Item 502 corresponds to layer 1, item 504 corresponds to layer 2, item 506 corresponds to layer 3, and item 508 corresponds to layer 4.

As shown in FIG. 5, the CDF of the chordal distance of the 1st two layers (502 and 504) is more or less the same (both drawn from the first eigenvector of each of the polarizations). The CDF of the chordal distance of the 2nd two layers (506 and 508) is also very close (both drawn from the second eigenvector of each of the polarizations).

Partial co-polarized transmission: in one embodiment only a subset of the layers undergo co-polarized transmission. For example, for a user with a total number of layers R, layers 1 to R' are transmitted on both polarizations, while layers R'+1 to R are transmitted in a co-polarized manner as indicated above. For example, with R=4 and R'=2 for one subband k, the LC matrix $W_{2_{2L\times R}}$ may be written as:

$$W_{2_{2L\times R}} = \begin{bmatrix} W_{2_{2L\times 1}}^{1,k} & W_{2_{2L\times 1}}^{2,k} & W_{2_{L\times 1}}^{3,k} & 0 \\ & & & W_{2_{L\times 1}}^{4,k} \end{bmatrix} \quad (16)$$

Figure 6A:
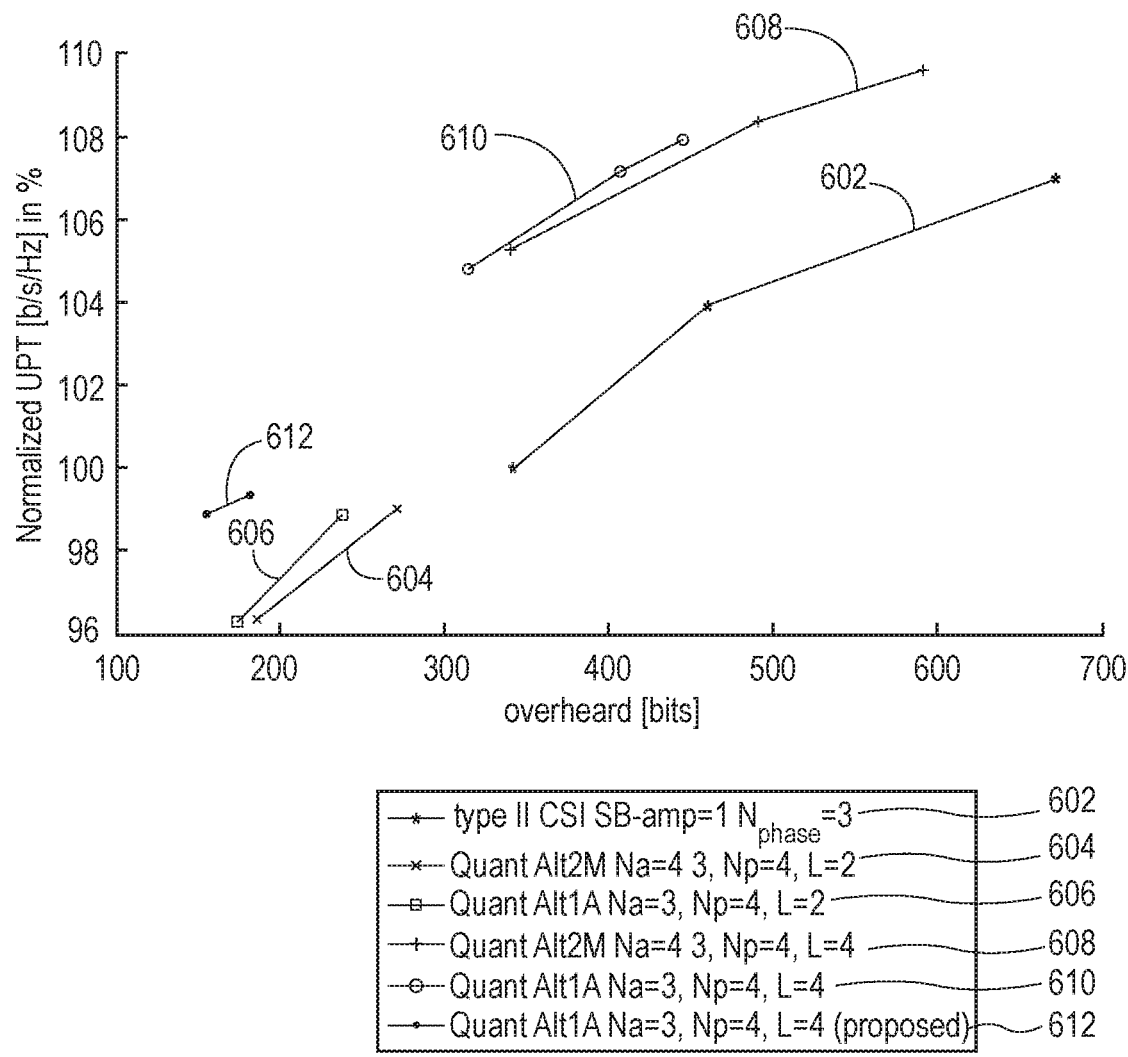
FIG. 6A depicts user perceived throughput (UPT) overhead performance with maximum rank 2 (MR2).
Figure 6B:
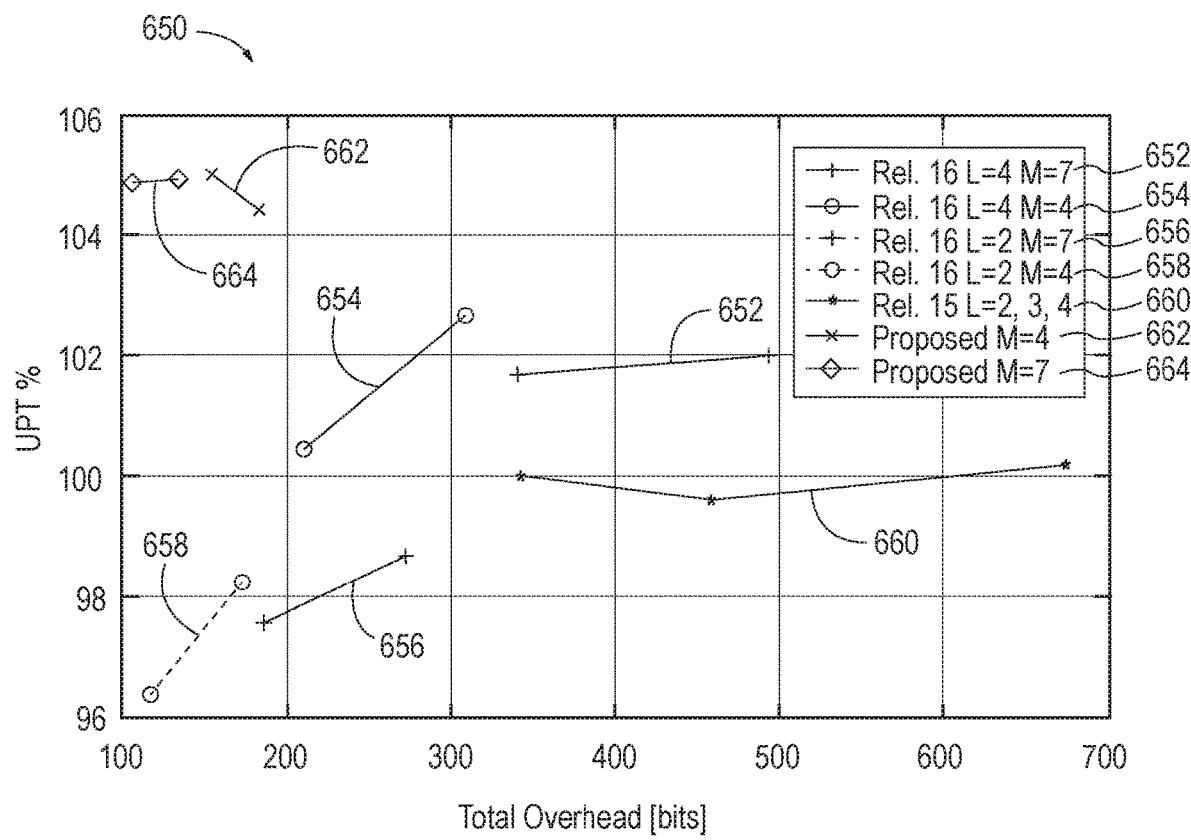
FIG. 6B depicts UPT overhead performance with MR2 at 30 kmph.

Simulation Results: system level simulations in the downlink are carried out in a 2×4×2 multiple-input/multiple-output (MIMO) channel with rank 2 transmission. The simulation assumed an frequency division duplex (FDD) system and a bursty traffic model with resource utilization 50%. Each UE had 4 receive antennas. A Dense Uma channel model was used from 3GPP [see, e.g., 3GPP, "3GPP TR 36.873 V12.6.0 33rd Generation Partnership Project; Technical Specification Group Radio Access Network; Study on 3D channel model for LTE (Release 12)," Tech. Rep., 2017] and 21 sectors. In FIG. 6A, 80% of the users are assumed to be indoor with velocity 3 kmph and 20% outdoor with velocity 30 kmph. In FIG. 6B, assumed is a case where all users are moving at a speed of 30 kmph.

Accordingly, FIG. 6A depicts a graph 600 showing user perceived throughput (UPT) overhead performance with maximum rank 2 (MR2), and FIG. 6B depicts a graph 650 showing UPT overhead performance with MR2 at 30 kmph. In FIG. 6A, item 602 corresponds to type II CSI SB-amp=1 $N_{phase}$=3, item 604 corresponds to Quant Alt2M Na=4 3, Np=4, L=2, item 606 corresponds to Quant Alt1A Na=3, Np=4, L=2, item 608 corresponds to Quant Alt2M Na=4 3, Np=4, L=4, item 610 corresponds to Quant Alt1A Na=3, Np=4, L=4, and item 612 corresponds to Quant Alt1A Na=3, Np=4, L=4 (described method, i.e., "Proposed"). As used herein, Quant refers to quantization, Alt1A and Alt2M (as is Alt4) are alternatives as defined as in section 2.5 of R1-192304 discussed in RAN1#96, L is the number of spatial beams per polarization, $N_{phase}$ (or Np) refers to the number of quantization resolution bits allocated to phase quantization, and SB-amp is the subband amplitude. In FIG. 6B, item 652 corresponds to Rel. 16 L=4 M=7, item 654 corresponds to Rel. 16 L=4 M=4, item 656 corresponds to Rel. 16 L=2 M=7, item 658 corresponds to Rel. 16 L=2 M=4, item 660 corresponds to Rel. 15 L=2,3,4, item 662 corresponds to the described method (i.e., "Proposed") M=4, and item 664 corresponds to the described method (i.e., "Proposed") M=7.

Also assumed in the simulation results is a bandwidth of 10 MHz with 52 physical resource blocks (PRBs), at a carrier frequency of 4 GHz. No multi-cell coordination is assumed. Multiple user MIMO (MU-MIMO) scheme is carried out, where a maximum of 4 UEs are spatially multiplexed on the same time-frequency resource. To build the W1 matrix, the W1 codebook from NR phase II was used in all schemes. For the FD compression scheme, assumptions were L=2,4 beams per polarization, M=7. For L=4 K0=7, 14, 28,42 was used and for L=2 K0=7,14 was used. A short term overhead periodicity of 5 ms is assumed for all schemes and a feedback delay of 4 ms.

Notes on compatibility with Rel. 16 and discussion: FIG. 6A depicts two quantization options for the baseline case (Rel. 16), namely options Alt1 A and Alt2M. Alt2M was chosen as the quantization option for Rel. 16 [RA1#96Notes—see, e.g., Chairman's Notes 3GPP RAN1#96] in RAN1#96. Examining the results in FIG. 6A, considering the two points on Rel. 16 curve with L=4 at (K0=7 and K0=28) shows that the described method (see item 612) gives max ~9% performance loss with the advantage of saving 73% of the overhead (3.8× more overhead is needed with state-of-the-art, see item 604) (154 bits vs 590 bits) and around 6% performance loss with the advantage of saving the overhead by 54% (339 bits vs 154 bits) (2.2× more overhead is needed with state-of-the-art). Comparing the described method (item 612) against Rel. 16 L=2 (state-of-the-art, see item 606), the described method (item 612) achieves the same performance gain while saving 42% of the overhead (270 bits vs 154 bits).

In the high speed case in FIG. 6B, FIG. 6B shows that the described method (item 662 and item 664) even achieved a better performance compared to Rel. 16 L=4 scheme, see items 652 and 654 (by more than 2%) while maintaining the advantage of overhead reduction (by approximately 50%).

This is because in this particular case, channel aging is a more dominant source of error. The described method increases the 'life time' of the CSI as explained previously (e.g., "The net result is a precoder that is more 'stable' over time and frequency, since the precoding for a layer is being done only on highly correlated elements (co-pol elements) rather than a mix of correlated and decorrelated elements (as done in Type I/II)"), and hence is a good solution in this case.

In RAN1#96 (see 7.2.8 of Chairman's Notes RAN1#96 NR Rel. 16), an agreement was made on linear combination coefficients (LCC) quantization. Specifically, the agreement was that on LCC quantization, agree on Alt2 (differential per polarization) per the description in R1-1902304. Refer to, for example, Summary of CSI enhancement for MU-MIMO, RAN1#96, Samsung. Alt2M depends on the existence of both polarization in one layer and hence is not compatible with the described method which separates different layers on different polarizations. However, an alternative quantization scheme to the described method is the simple quantization scheme Alt1A which quantizes every FD component with a fixed quantization resolution (here 4 bits for the phase component and 3 bits for the amplitude component). Another alternative is to combine it with Alt4 for quantization which assumes different quantization resolution for the different FD components, see [R1-1902304] for more detailed information. As seen in FIG. 6A, for the same quantization scheme the described method (i.e., "Proposed") provides an overhead reduction against Rel. 16 with L=2 at the same performance.

It is also worth noting that in Rel. 16 up to L=6 beams per polarization may be used and so we expect also gains against Rel. 16 with the described method and L=6 beams per polarization. So overall, the described method is compatible with any NR type II CSI feedback scheme that is based on FD compression or even just differential quantization (as in Rel. 15 NR type II CSI). However the described method is not compatible with quantization schemes that assume that both polarizations exist in one layer. The good gains achieved in Rel. 16 vs Rel. 15 NR type II CSI came from the FD compression step as clear in FIG. 6A. Thus it is likely possible to change the quantization scheme for future releases.

Figure 7:
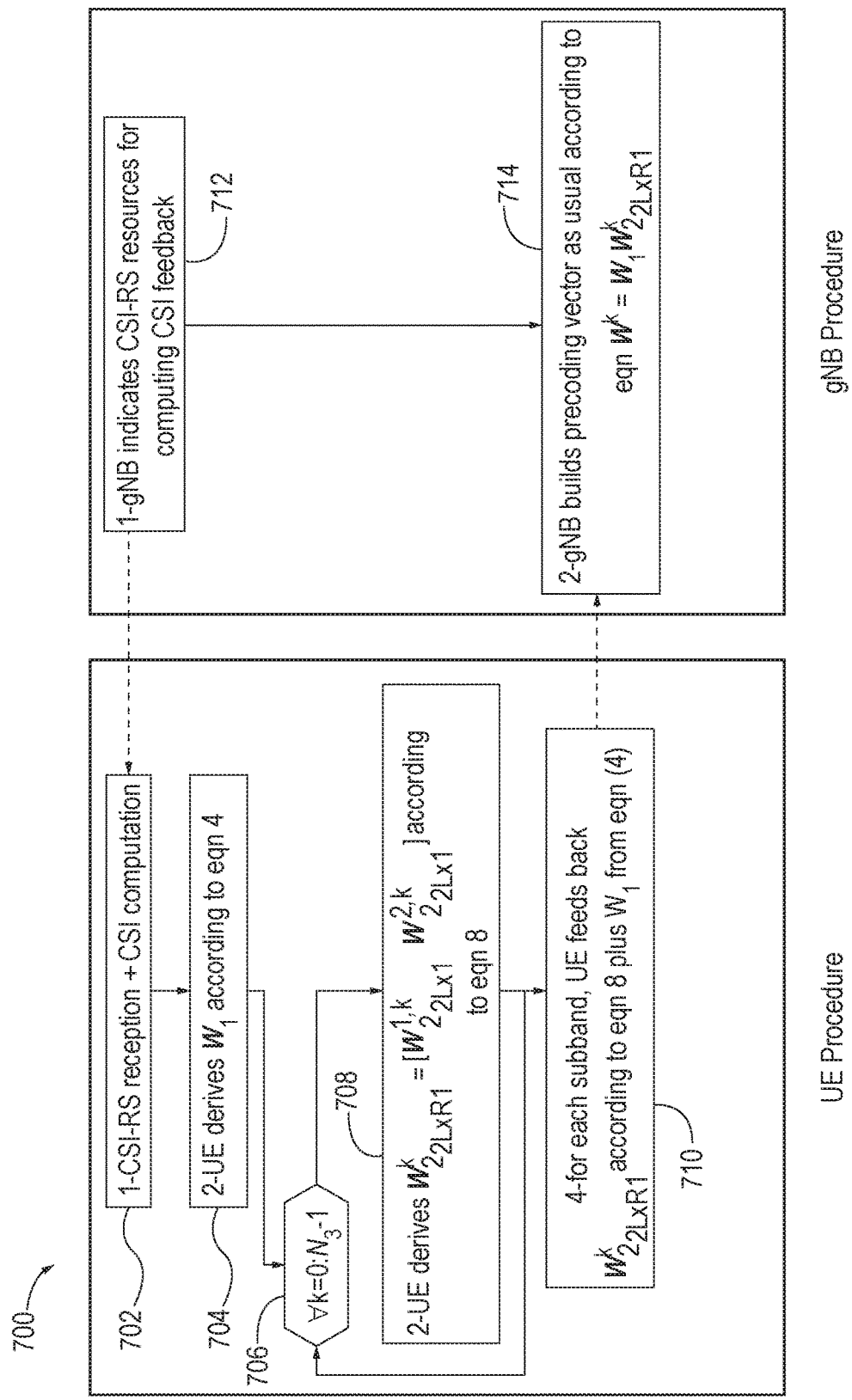
FIG. 7 depicts a user equipment-gNB (UE-gNB) procedure in the baseline case of Rel. 15 NR type II CSI.
Figure 8:
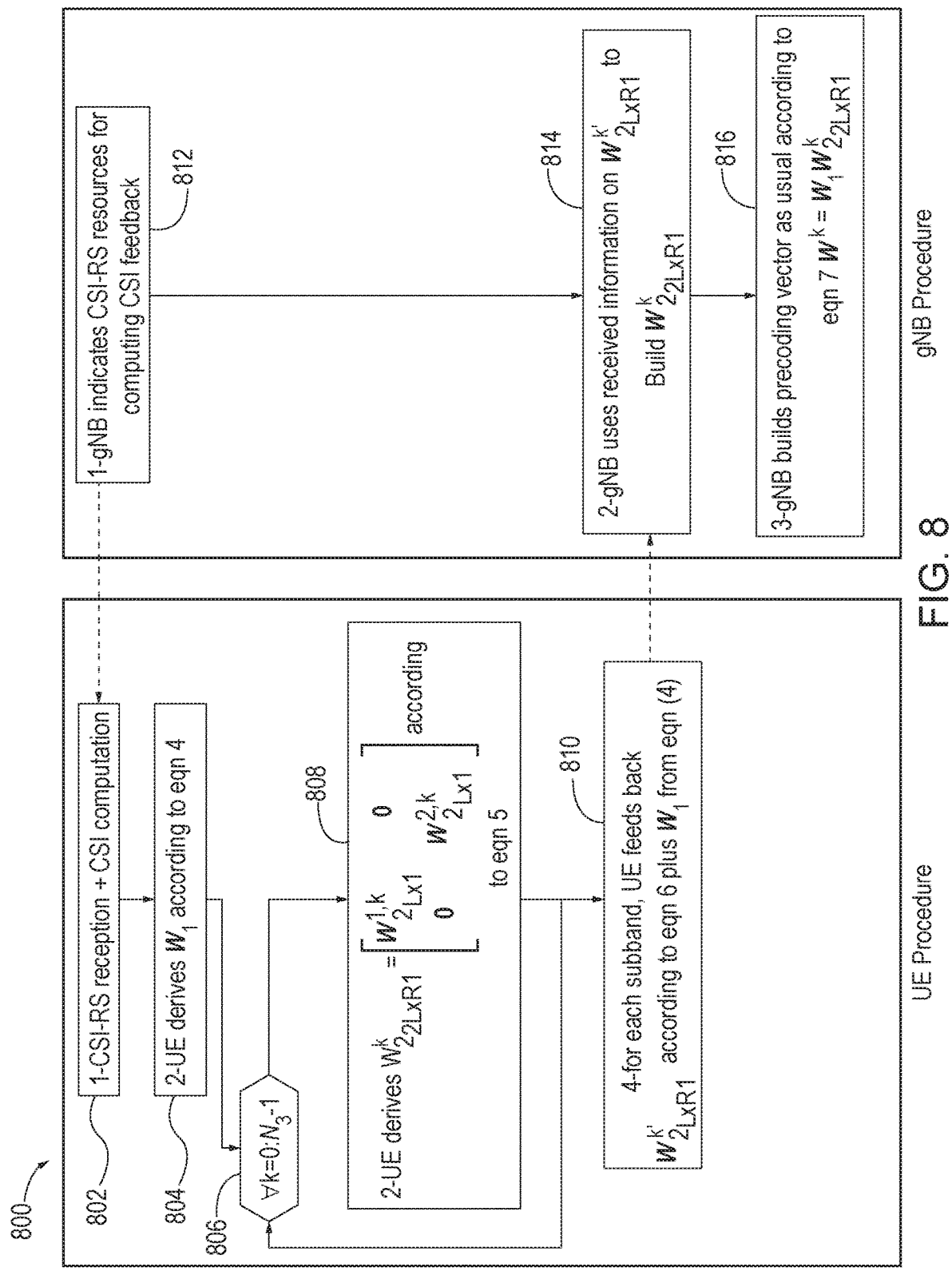
FIG. 8 depicts a UE-gNB procedure implementing the method described herein when implemented on Rel. 15 NR type II CSI.
Figure 9:
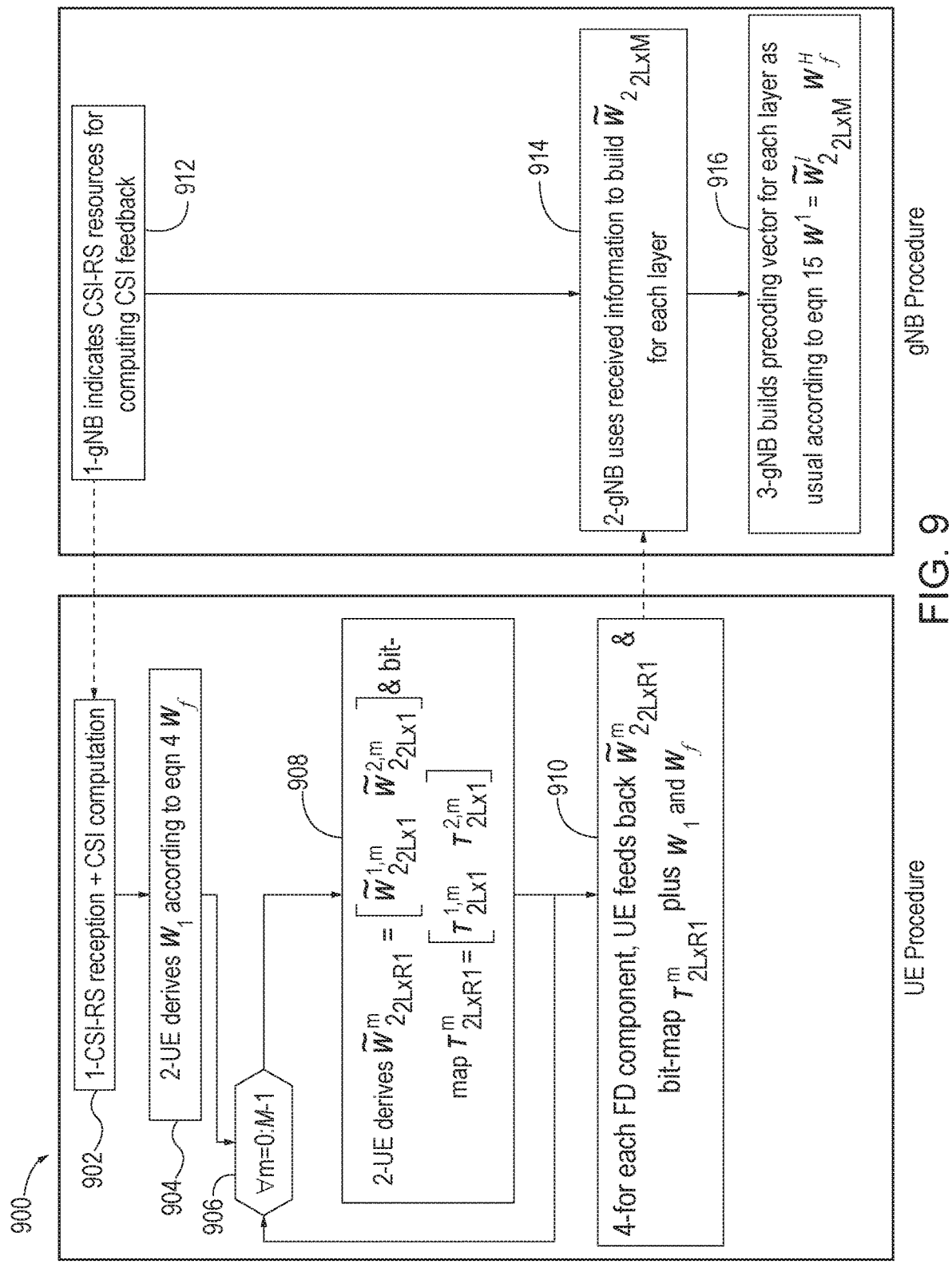
FIG. 9 depicts a UE-gNB procedure in the baseline case of Rel. 16 FD compression.
Figure 10:
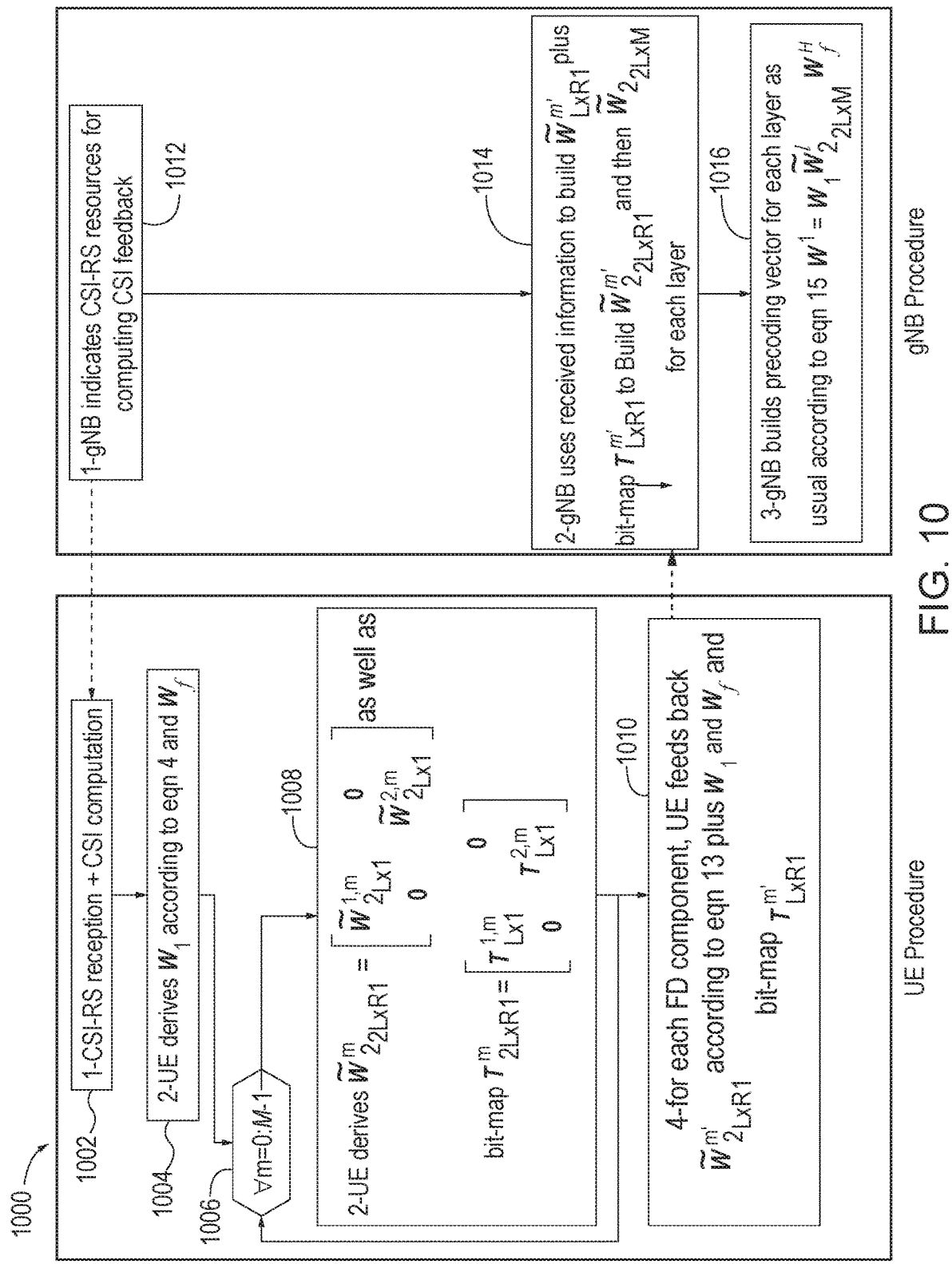
FIG. 10 depicts a UE-gNB procedure implementing the method described herein when implemented on Rel. 16 FD compression.

In FIG. 7 illustrates the UE-gNB procedure 700 in the baseline case of Rel. 15 NR type II CSI, and FIG. 8 illustrates the procedure 800 when the described method is used on Rel. 15 NR type II CSI. As shown in FIG. 8, for the method described herein what is fed back to the gNB at 810 is $W_{2_{L \times RI}}^{k'} = [W_{2_{L \times 1}}^{1,k} \ W_{2_{L \times 1}}^{2,k}]$ which has a smaller size comparted to $W_{2_{2L \times RI}}^{k}$ (see item 710 of FIG. 7) in the baseline case. In order to build the precoding vector for the described method, the structure by which $W_{2_{L \times RI}}^{k'}$ was built at the UE has to be known, i.e., which layers mapped to which polarizations. After that the gNb at 814 may reconstruct $W_{2_{2L \times RI}}^{k}$ from $W_{2_{L \times RI}}^{k'}$. FIG. 9 illustrates the baseline procedure for Rel. 16, and FIG. 10 illustrates the flow chart corresponding to the described method for Rel. 16.

FIGS. 7-10 are built assuming 2 layers for simplicity but can be extended to any number of layers. Furthermore, in all of the procedures including FIGS. 7-10, the gNB uses the precoding vector to send data to the UE, and the UE receives and uses that data. Accordingly:

FIG. 7 depicts a user equipment-gNB (UE-gNB) procedure 700 in the baseline case of Rel. 15 NR type II CSI. At 712, the gNB indicates channel state information reference signal (CSI-RS) resources for computing CSI feedback. At 702, the UE receives the indication of CSI-RS resources for performing a CSI computation. At 704, the UE derives $W_1$ according to equation (4). Item 706 indicates that the UE iterates over the number of subbands, where there are $N_3$ subbands. That is in FIG. 7, the UE iterates from k=0 to k=$N_3$-1. At 708, the UE derives $W_{2_{2L \times RI}}^{k} = [W_{2_{L \times 1}}^{1,k} \ W_{2_{L \times 1}}^{2,k}]$ according to equation (8). At 710, for each subband, the UE feeds back $W_{2_{2L \times RI}}^{k}$ to the gNB according to equation (8) plus $W_1$ from equation (4). At 714, the gNB builds a precoding vector as usual according to equation (7) $W^k = W_1 W_{2_{2L \times RI}}^{k}$.

FIG. 8 depicts a UE-gNB procedure 800 implementing the method described herein when implemented on Rel. 15 NR type II CSI. The UE-gNB procedure 800 may for example be implemented by UE 110 and RAN node 170 of FIG. 1, where the RAN node 170 is a gNB. At 812, the gNB indicates CSI-RS resources for computing CSI feedback. At 802, the UE receives the indication of CSI-RS resources for performing a CSI computation. At 804, the UE derives $W_1$ according to equation (4). Item 806 indicates that the UE iterates over the number of subbands, where there are $N_3$ subbands. That is in FIG. 8, the UE iterates from k=0 to k=$N_3$-1. At 808, the UE derives $$W_{2_{2L \times RI}}^{k} = \begin{bmatrix} W_{2_{L \times 1}}^{1,k} & 0 \\ 0 & W_{2_{L \times 1}}^{2,k} \end{bmatrix}$$

according to equation (5). At 810, for each subband, the UE feeds back $W_{2_{L \times RI}}^{k'}$ to the gNB according to equation (6) plus $W_1$ from equation (4). At 814, the gNB uses received information on $W_{2_{L \times RI}}^{k'}$ to build $W_{2_{2L \times RI}}^{k}$. At 716, the gNB builds a precoding vector as usual according to equation (7) $W^k = W_1 W_{2_{2L \times RI}}^{k}$.

FIG. 9 depicts a UE-gNB procedure 900 in the baseline case of Rel. 16 FD compression. At 912, the gNB indicates CSI-RS resources for computing CSI feedback. At 902, the UE receives the indication of CSI-RS resources for performing a CSI computation. At 904, the UE derives $W_1$ according to equation (4) and $W_f$. Item 906 indicates that the UE iterates over the number of FD coefficients, where there are M FD coefficients. That is in FIG. 9, the UE iterates from m=0 to m=M-1. At 908, the UE derives $\tilde{W}_{2_{2L \times RI}}^{m} = [\tilde{W}_{2_{L \times 1}}^{1,m} \ \tilde{W}_{2_{L \times 1}}^{2,m}]$ and bit-map $T_{2L \times RI}^{m} = [T_{2L \times 1}^{1,m} \ T_{2L \times 1}^{2,m}]$. At 910, for each FD component, the UE feeds back to the gNB $\tilde{W}_{2_{2L \times RI}}^{m}$ and bit-map $T_{2L \times RI}^{m}$ plus $W_1$ and $W_f$. At 914, the gNB uses received information to build $\tilde{W}_{2_{2L \times M}}$ for each layer. At 916, the gNB builds a precoding vector as usual according to equation (15) $W^l = W_1 \tilde{W}_{2_{2L \times M}}^{l} W_f^H$.

FIG. 10 depicts a UE-gNB procedure 1000 implementing the method described herein when implemented on Rel. 16 FD compression. The UE-gNB procedure 1000 may for example be implemented by UE 110 and RAN node 170 of FIG. 1, where the RAN node 170 is a gNB. At 1012, the gNB indicates CSI-RS resources for computing CSI feedback. At 1002, the UE receives the indication of CSI-RS resources for performing a CSI computation. At 1004, the UE derives $W_1$ according to equation (4) and $W_f$. Item 1006 indicates that the UE iterates over the number of FD coefficients, where there are M FD coefficients. That is in FIG. 10, the UE iterates from m=0 to m=M-1. At 1008, the UE derives $$\tilde{W}_{2_{2L \times RI}}^{m} = \begin{bmatrix} \tilde{W}_{2_{L \times 1}}^{1,m} & 0 \\ 0 & \tilde{W}_{2_{L \times 1}}^{2,m} \end{bmatrix}$$

$$T_{2L \times RI}^m = \begin{bmatrix} T_{L \times 1}^{1,m} & 0 \\ 0 & T_{L \times 1}^{2,m} \end{bmatrix}.$$

At 1010, for each FD component, the UE feeds back to the gNB $\tilde{W}_{2_{L \times RI}}^{m'}$ according to equation (13) plus $W_1$ and $W_f$ and bit-map $T_{L \times RI}^{m'}$. At 1014, the gNB uses received information on $\tilde{W}_{2_{L \times RI}}^{m'}$ plus bit-map $T_{L \times RI}^{m'}$ to build $\tilde{W}_{2_{L \times RI}}^{m}$ and then $\tilde{W}_{2_{L \times M}}$ for each layer. At 1016, the gNB builds a precoding vector for each layer as usual according to equation (15) $W^l = W_1 \tilde{W}_{2_{L \times M}}^{l} W_f^H$.

In case the described methods become part of standardized procedures/methods, the described methods may be implemented by a gNB base station product such as a gNB for improving the spectral efficiency of the system for a given feedback rate and/or reducing the overall feedback overhead for NR MIMO and massive MIMO (mMIMO) systems. The usage of the described methods may be regulated by standardization.

In accordance with an example method, a method includes feeding back compressed channel state information, wherein at least one layer is restricted to be transmitted on one polarization and the feedback for the at least one layer only involves the channel state information on the one polarization.

In accordance with an example method, a method includes receiving fed back compressed channel state information, wherein at least one layer is restricted to be transmitted on one polarization and the feedback for the at least one layer only involves the channel state information on the one polarization.

In accordance with an example apparatus, an apparatus includes at least one processor; and at least one memory including computer program code; wherein the at least one memory and the computer program code are configured to, with the at least one processor, cause the apparatus at least to perform: feeding back compressed channel state information, wherein at least one layer is restricted to be transmitted on one polarization and the feedback for the at least one layer only involves the channel state information on the one polarization.

In accordance with an example apparatus, an apparatus includes at least one processor; and at least one memory including computer program code; wherein the at least one memory and the computer program code are configured to, with the at least one processor, cause the apparatus at least to perform: receiving fed back compressed channel state information, wherein at least one layer is restricted to be transmitted on one polarization and the feedback for the at least one layer only involves the channel state information on the one polarization.

In accordance with an example non-transitory program storage device, a non-transitory program storage device readable by a machine, tangibly embodying a program of instructions executable by the machine for performing operations is disclosed, the operations comprising: feeding back compressed channel state information, wherein at least one layer is restricted to be transmitted on one polarization and the feedback for the at least one layer only involves the channel state information on the one polarization.

In accordance with an example non-transitory program storage device, a non-transitory program storage device readable by a machine, tangibly embodying a program of instructions executable by the machine for performing operations is disclosed, the operations comprising: receiving fed back compressed channel state information, wherein at least one layer is restricted to be transmitted on one polarization and the feedback for the at least one layer only involves the channel state information on the one polarization.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
    feeding back compressed channel state information for at least one layer, wherein the feedback for channel state information comprises feedback of a set of combining coefficients used to combine a number of spatial beams on one polarization, and wherein the set of combining coefficients on the at least one layer are calculated so that the set of combining coefficients on one layer on at least one subband is restricted to be applicable to one polarization, and the feedback of the set of combining coefficients on the at least one layer involves the set of combining coefficients that are only on the one polarization.

2. The method of claim 1, wherein the feedback of the set of combining coefficients on at least one subband for a first layer is transmitted wherein the first layer is restricted to be transmitted only on either a first polarization or a second polarization.

3. The method of claim 1, wherein the feedback of the set of combining coefficients on at least one subband for a first layer is transmitted wherein the first layer is restricted to be transmitted only on a first polarization, and the feedback of the set of combining coefficients on at least one subband for a second layer is transmitted wherein the second layer is restricted to be transmitted only on a second polarization.

4. The method of claim 1, wherein the feedback of the set of combining coefficients on at least one subband for a first layer is transmitted wherein the first layer is restricted to be transmitted only on a first polarization, the feedback of the set of combining coefficients on at least one subband for a second layer is transmitted wherein the second layer is restricted to be transmitted only on a second polarization, and the feedback of the set of combining coefficients on at least one subband for a third layer is transmitted wherein the third layer is restricted to be transmitted only on either the first polarization or the second polarization.

5. The method of claim 1, wherein either:
    the feedback of the set of combining coefficients on at least one subband for a first layer and a third layer are transmitted wherein the first and third layers are restricted to be transmitted only on a first polarization, and the feedback of the set of combining coefficients on at least one subband for a second layer and fourth layer are transmitted wherein the second and fourth layers are restricted to be transmitted only on a second polarization; or
    the feedback of the set of combining coefficients on at least one subband for the first layer and the fourth layer are transmitted wherein the first and fourth layers are restricted to be transmitted only on the first polarization, and the feedback of the set of combining coefficients on at least one subband for the second layer and the third layer are transmitted wherein the second and third layers are restricted to be transmitted only on the second polarization.

6. The method of claim 1, wherein for a set comprising a plurality of layers, the feedback of the set of combining coefficients on at least one subband is fed back for a first subset of the plurality of layers that are restricted to be transmitted only on one polarization, and the feedback of the set of combining coefficients on at least one subband is fed back for a second subset of the plurality of layers that are restricted to be transmitted on more than one polarization.

7. The method of claim 1, performed for each subband of a plurality of subbands, wherein a first set of linear combination coefficients and at least one other set of linear combination coefficients are of a size corresponding to a number of beams per polarization by the number of subbands, and further comprising:
determining the first set of linear combination coefficients of a first long-term spatial beam drawn from a first eigenvector of a first polarization;
determining the at least one other set of linear combination coefficients of at least one other long-term spatial beam drawn from a strongest eigenvector of at least one other polarization;
determining a linear combination matrix based on the first set of linear combination coefficients having a dimension not exceeding a number of beams of the first polarization, and the at least one other set of linear combination coefficients having a dimension not exceeding a number of beams of the at least one other polarization; and
transmitting, both a set of non-zero elements of the linear combination matrix and a grid-of-beam matrix.

8. The method of claim 1, performed for each frequency domain component of a plurality of frequency domain components, wherein a first set of linear combination coefficients and at least one other set of linear combination coefficients are of a size corresponding to a number of beams per polarization by the number of frequency domain components, and further comprising:
determining the first set of linear combination coefficients of a first long-term spatial beam drawn from a first eigenvector of a first polarization;
determining the at least one other set of linear combination coefficients of at least one other long-term spatial beam drawn from a strongest eigenvector of at least one other polarization;
determining a first linear combination matrix based on the first set of linear combination coefficients having a dimension not exceeding a number of beams of the first polarization, and the at least one other set of linear combination coefficients having a dimension not exceeding a number of beams of the at least one other polarization;
determining a bit-map used to indicate non-zero coefficient indices within the first linear combination matrix; and
transmitting each of 1) a set of non-zero elements of the first linear combination matrix, 2) a grid-of-beam matrix, 3) a frequency domain matrix, and 4) the bit-map.

9. The method of claim 8, wherein each of the first set of linear combination coefficients and the at least one other set of linear combination coefficients is drawn from an eigenvector number x=⌈0.5×l⌉, where l corresponds to a layer index, set of linear combination coefficients is transmitted on the first polarization if l is odd, and set of linear combination coefficients is transmitted on the at least one other polarization if l is even.

10. An apparatus comprising:
at least one processor; and
at least one memory including computer program code, wherein the at least one memory and the computer program code are configured to, with the at least one processor, cause the apparatus at least to:
feed back compressed channel state information for at least one layer, wherein the feedback for channel state information comprises feedback of a set of combining coefficients used to combine a number of spatial beams on one polarization, and wherein the set of combining coefficients on the at least one layer are calculated so that the set of combining coefficients on one layer on at least one subband is restricted to be applicable to one polarization, and the feedback of the set of combining coefficients on the at least one layer involves the set of combining coefficients that are only on the one polarization.

11. The apparatus of claim 10, wherein the feedback of the set of combining coefficients on at least one subband for a first layer is transmitted wherein the first layer is restricted to be transmitted only on either a first polarization or a second polarization.

12. The apparatus of claim 10, wherein the feedback of the set of combining coefficients on at least one subband for a first layer is transmitted wherein the first layer is restricted to be transmitted only on a first polarization, and the feedback of the set of combining coefficients on at least one subband for a second layer is transmitted wherein the second layer is restricted to be transmitted only on a second polarization.

13. The apparatus of claim 10, wherein the feedback of the set of combining coefficients on at least one subband for a first layer is transmitted wherein the first layer is restricted to be transmitted only on a first polarization, the feedback of the set of combining coefficients on at least one subband for a second layer is transmitted wherein the second layer is restricted to be transmitted only on a second polarization, and the feedback of the set of combining coefficients on at least one subband for a third layer is transmitted wherein the third layer is restricted to be transmitted only on either the first polarization or the second polarization.

14. The apparatus of claim 10, wherein either:
the feedback of the set of combining coefficients on at least one subband for a first layer and a third layer are transmitted wherein the first and third layers are restricted to be transmitted only on a first polarization, and the feedback of the set of combining coefficients on at least one subband for a second layer and fourth layer are transmitted wherein the second and fourth layers are restricted to be transmitted only on a second polarization; or
the feedback of the set of combining coefficients on at least one subband for the first layer and the fourth layer are transmitted wherein the first and fourth layers are restricted to be transmitted only on the first polarization, and the feedback of the set of combining coefficients on at least one subband for the second layer and the third layer are transmitted wherein the second and third layers are restricted to be transmitted only on the second polarization.

15. The apparatus of claim 10, wherein for a set comprising a plurality of layers, the feedback of the set of combining coefficients on at least one subband is fed back for a first subset of the plurality of layers that are restricted to be transmitted only on one polarization, and the feedback of the set of combining coefficients on at least one subband is fed back for a second subset of the plurality of layers that are restricted to be transmitted on more than one polarization.

16. The apparatus of claim 10, performed for each subband of a plurality of subbands, wherein a first set of linear combination coefficients and at least one other set of linear combination coefficients are of a size corresponding to a number of beams per polarization by the number of subbands, and the apparatus is further caused to:
determine the first set of linear combination coefficients of a first long-term spatial beam drawn from a first eigenvector of a first polarization;
determine the at least one other set of linear combination coefficients of at least one other long-term spatial beam drawn from a strongest eigenvector of at least one other polarization;
determine a linear combination matrix based on the first set of linear combination coefficients having a dimension not exceeding a number of beams of the first polarization, and the at least one other set of linear combination coefficients having a dimension not exceeding a number of beams of the at least one other polarization; and
transmit, both a set of non-zero elements of the linear combination matrix and a grid-of-beam matrix.

17. The apparatus of claim 10, performed for each frequency domain component of a plurality of frequency domain components, wherein a first set of linear combination coefficients and at least one other set of linear combination coefficients are of a size corresponding to a number of beams per polarization by the number of frequency domain components, and the apparatus is further caused to:
determine the first set of linear combination coefficients of a first long-term spatial beam drawn from a first eigenvector of a first polarization;
determine the at least one other set of linear combination coefficients of at least one other long-term spatial beam drawn from a strongest eigenvector of at least one other polarization;
determine a first linear combination matrix based on the first set of linear combination coefficients having a dimension not exceeding a number of beams of the first polarization, and the at least one other set of linear combination coefficients having a dimension not exceeding a number of beams of the at least one other polarization;
determine a bit-map used to indicate non-zero coefficient indices within the first linear combination matrix; and
transmit each of 1) a set of non-zero elements of the first linear combination matrix, 2) a grid-of-beam matrix, 3) a frequency domain matrix, and 4) the bit-map.

18. The apparatus of claim 17, wherein each of the first set of linear combination coefficients and the at least one other set of linear combination coefficients is drawn from an eigenvector number $x=\lceil 0.5 \times l \rceil$, where l corresponds to a layer index, set of linear combination coefficients is transmitted on the first polarization if l is odd, and set of linear combination coefficients is transmitted on the at least one other polarization if l is even.

19. The apparatus of claim 10, wherein the compressed channel state information is fed back on an uplink transmission and the at least one layer is transmitted on a downlink transmission.

20. An apparatus comprising:
at least one processor; and
at least one memory including computer program code, wherein the at least one memory and the computer program code are configured to, with the at least one processor, cause the apparatus at least to:
receive, from a user equipment, compressed channel state information for at least one layer, wherein the channel state information comprises a set of combining coefficients used to combine a number of spatial beams on one polarization, and wherein the set of combining coefficients on the at least one layer are calculated so that the set of combining coefficients on one layer on at least one subband is restricted to be applicable to one polarization, and the set of combining coefficients on the at least one layer involves the set of combining coefficients that are only on the one polarization.

21. The apparatus of claim 20, wherein the apparatus is further caused to:
receive a set of non-zero elements of a linear combination matrix and a grid-of-beam matrix;
build a reconstructed linear combination matrix based on the set of non-zero elements; and
build a precoder with co-polarized elements for multi-layer communication according to the reconstructed linear combination matrix and the grid-of-beam matrix.

* * * * *